United States Patent
Brunet et al.

(10) Patent No.: US 10,303,170 B2
(45) Date of Patent: May 28, 2019

(54) METHOD FOR CONTROLLING A SET OF ROBOTS, AND SET OF ROBOTS

(71) Applicants: THALES, Courbevoie (FR); ECOLE NATIONALE SUPERIEURE DE TECHNIQUES AVANCEES BRETAGNE, Brest (FR)

(72) Inventors: Jean-Philippe Brunet, Plougonvelin (FR); Thomas Sousselier, Paris (FR); Johann Dreo, Epernon (FR); Luc Jaulin, Brest (FR)

(73) Assignees: THALES, Courbevoie (FR); ECOLE NATIONALE SUPERIEURE DE TECHNIQUES AVANCEES BRETAGNE, Brest (FR)

( * ) Notice: Subject to any disclaimer, the term of this patent is extended or adjusted under 35 U.S.C. 154(b) by 0 days.

(21) Appl. No.: 14/649,867

(22) PCT Filed: Dec. 6, 2013

(86) PCT No.: PCT/EP2013/075781
§ 371 (c)(1),
(2) Date: Jun. 4, 2015

(87) PCT Pub. No.: WO2014/090697
PCT Pub. Date: Jun. 19, 2014

(65) Prior Publication Data
US 2015/0331421 A1    Nov. 19, 2015

(30) Foreign Application Priority Data

Dec. 11, 2012  (FR) .................................. 12 03360

(51) Int. Cl.
*G05D 1/00* (2006.01)
*G05D 1/10* (2006.01)
*G05D 1/06* (2006.01)

(52) U.S. Cl.
CPC ......... *G05D 1/0088* (2013.01); *G05D 1/0692* (2013.01); *G05D 1/10* (2013.01); *G05D 1/104* (2013.01); *Y10S 901/01* (2013.01)

(58) Field of Classification Search
USPC .......................................................... 701/23
See application file for complete search history.

(56) References Cited

U.S. PATENT DOCUMENTS

| 2006/0235584 | A1 | 10/2006 | Fregene et al. |
| 2009/0079839 | A1* | 3/2009 | Fischer .................. G01S 7/003 348/218.1 |

(Continued)

FOREIGN PATENT DOCUMENTS

| JP | 2001-306145 A | 11/2001 |
| JP | 2007-293551 A | 11/2007 |

(Continued)

OTHER PUBLICATIONS

Na Cen et al., "Formation Control of Robotic Swarms Based on Sonar Sensing," Intelligent Sensors, Sensor Networks and Information Processing (ISSNIP), 2009 5th International Conference, IEEE, Dec. 7, 2009, pp. 31-36, XP031630513.

(Continued)

*Primary Examiner* — James M McPherson
(74) *Attorney, Agent, or Firm* — Baker & Hostetler LLP

(57) ABSTRACT

A method is provided for piloting a set of robots comprising, for each robot, a step of generation of a guidance instruction for the robot at a given instant, the guidance instructions for the set of robots being determined from a single set of constraints comprising a pack constraint comprising at least one set of at least one first relative positioning constraint between a robot and its neighbors of the first order in the pack for the set of robots to form a pack exhibiting a predetermined shape, the method further comprising a step (Continued)

of piloting of the robots so as to observe the guidance instruction.

16 Claims, 4 Drawing Sheets

(56) References Cited

U.S. PATENT DOCUMENTS

2013/0314502 A1* 11/2013 Urbach .................. H04N 7/181
348/46
2015/0105946 A1* 4/2015 Kumar .................. B64C 39/024
701/3
2015/0120126 A1* 4/2015 So .......................... G01C 23/00
701/26

FOREIGN PATENT DOCUMENTS

JP        2010-188893  A    9/2010
WO         02/08843   A2    1/2002

OTHER PUBLICATIONS

Guilherme A. S. Pereira et al., "Formation Control with Configuration Space Constraints," Proceedings of the 2003 IEEE/RSJ International Conference on Intelligent Robots and Systems, Oct. 2003, vol. 3, pp. 2755-2760, XP010675506.
Jakob Fredslund et al., "A General Algorithm for Robot Formations Using Local Sensing and Minimal Communication," IEEE Transactions on Robotics and Automation, vol. 18, No. 5, Oct. 2002, pp. 837-846, XP011079557.
English Translation of Notice of Rejection in Japanese Patent Application No. 2015-546028, dated May 29, 2018.

* cited by examiner

METHOD FOR CONTROLLING A SET OF ROBOTS, AND SET OF ROBOTS

CROSS-REFERENCE TO RELATED APPLICATIONS

This application is a National Stage of International patent application PCT/EP2013/075781, filed on Dec. 6, 2013, which claims priority to foreign French patent application No. FR 1203360, filed on Dec. 11, 2012, the disclosures of which are incorporated by reference in their entirety.

FIELD OF THE INVENTION

The invention relates to the field of piloting of a set of robots, such as, for example, drones, provided with independent propulsion capabilities and without any onboard (human) pilot.

BACKGROUND

Numerous applications require the movement of a set of robots in a swarm or in packs, whether in an aquatic environment (for example a submarine environment), in an airborne environment or in a land environment. Known applications that can be cited in a submarine environment include the detection of mines or of pollution sources. In these applications, it may be necessary to pilot robots according to different mission profiles (or trajectories) and according to different pack configurations. For example, in the mine detection applications, the robots are preferably piloted in such a way that they are arranged in a line and spaced two-by-two by a fixed distance along this line. A mission profile consists in making them move in a straight line at right angles to the line along which they are spaced. The distance separating two adjacent robots is chosen in such a way as to be at most two times equal to the range of the mine detection means embedded on board the robots, error margins included. This makes it possible to leave no gap in the exploration of a given terrain by the pack concerned.

The piloting of a set of robots in order to make it fulfill its mission is a real issue. In effect, the computation capacities of the robots are, by definition, limited and encourage the use of an approach in which the number of interactions compensate for the lack of computation power. Similarly, the miniaturization of robots induces an increase in the uniformity of capacity thereof that has to be compensated to guarantee the flexibility of the pack. The difficulty in such piloting increases notably when the aim is to maintain a particular pack configuration.

There are a number of piloting methods for ensuring that cohesion is maintained in a swarm. In these conditions, the robots are individualized. Each robot has a role and a predetermined place in the pack. The most obvious solution relies on the centralization of the absolute positions of the robots within a coordinator system (or master system which can be a master robot). The master robot pilots the other robots so as to place them in the positions which are respectively assigned to them in the pack. Another solution consists in making all the robots communicate with one another. In this way, each exchanges its position with all of the robots of the pack and moves to a position which is assigned to it in the pack and relative to the trajectory.

One drawback with these solutions is that they are very costly in communication terms. While communication is relatively easy in air and with a limited number of robots, it is more difficult in water or when the number of robots increases in the pack.

Moreover, with each robot having an assigned place in the pack, a constant piloting has to be applied to all the robots in order to verify that there have been no robots lost, to manage the risks of collision and to schedule the collective movements. This renders the system not very adaptive and not very robust.

Since the positioning of the robots is absolute in a centralized solution, great accuracy is needed for the relative positioning of the robots in the pack to be of acceptable relative accuracy. A rapid exchange of the positions is, additionally, necessary, any latency demands the availability of position anticipation models that are difficult to implement, and sources of errors. Poor relative positioning penalizes the coverage of the terrain and risks creating gaps during its exploration. For example, in a mine detection application in which the range of the mine detection means with which the robots are provided is 5 m, if the distance between the adjacent robots in the pack described above is 10 m, all the terrain in which the robots are moving around is explored. Now, The submarine navigation systems make it possible to determine the absolute position of a robot with an accuracy of only a few meters. It is very difficult to keep the robots spaced apart by 10 m by means of these navigation systems. One solution for avoiding the gaps consists in bringing the robots closer to one another so that their detection areas overlap. However, this leads to exploration systems that are less efficient (it takes longer to scan a given surface terrain) or more costly (to obtain the same efficiencies in terms of exploration time, the number of robots in the pack has to be increased).

Finally, the centralization or the dependency on elaborate communication causes the robustness of the system to be reduced. In effect, in these approaches, the tolerance to failures or the flexibility to adapt to unforeseen events require efforts that are too great to be performed at reasonable cost.

SUMMARY OF THE INVENTION

The aim of the present invention is to propose a method for piloting a set of robots that makes it possible to bring it into or keep it in a predetermined pack configuration in a robust and inexpensive manner.

To this end, the subject of the invention is a method for piloting a set of robots to bring it into or keep it in a predetermined pack configuration and for it to follow a trajectory that is globally parallel to an ideal trajectory, the method comprising, for each robot:
  a step of generation of a guidance instruction for said robot at a given instant corresponding to a correction to be made to the velocity vector of said robot, the guidance instructions for each of the robots of the set of robots being determined from a set of constraints common to all the robots comprising a pack constraint comprising at least one set of at least one relative positioning constraint between the robot and neighbors of the first order in the pack comprising a first distance constraint corresponding to an ideal distance having to separate the robot from its neighbors of the first order in the pack configuration,
  a step of piloting of the robot so as to observe the guidance instruction.

Advantageously, the set of constraints comprises a constraint of belonging representative of a second relative positioning constraint between each robot and the other robots, that the other robots have to effectively verify to belong to a set of effective neighbors of said robot at the given instant, as well as an ideal four-dimensional trajectory ideally followed by the robots of the set of robots and a confidence range defined by the position of said robot relative to an ideal position corresponding to a position that said robot ought to occupy if it followed the ideal trajectory and possibly by its orientation relative to the three-dimensional ideal trajectory included in the four-dimensional trajectory, and in which the step of generation of the guidance instruction for said robot at the given instant comprises a step of determination of a set of effective neighbors of said robot verifying the constraint of belonging in the vicinity of said robot, the guidance instruction for said robot at the given instant being generated from the position of said robot:

relative to a set of at least one target position defined from an effective position of each of the effective neighbors of the set of effective neighbors and from the pack constraint and relative to a preferred position corresponding to a point of the confidence range, when the set of the effective neighbors is not empty, relative to the preferred position when the set of effective neighbors is empty.

Advantageously, the confidence range is an ideal position and in which the preferred position is the ideal position.

Advantageously, the confidence range is a curve, a surface or a volume.

Advantageously, the step of generation of the guidance instruction comprises:

an acquisition step, to acquire, by means of perception means embedded on board said robot, measurements making it possible to locate the other robots relative to said robot, a selection step, using said measurements, in which a set of effective neighbors of the robot concerned is selected that corresponds to a subset of robots of the other robots which observes the constraint of belonging with respect to the robot, the set of effective neighbors being empty when the robot has acquired no measurement enabling it to locate the other robots in the acquisition step.

Advantageously, the step of generation of the guidance instruction for said robot comprises, when the set of effective neighbors comprises at least one robot called effective neighbor, for each effective neighbor:

a step of determination of an effective position corresponding to the position effectively occupied by said at least one effective neighbor relative to said robot from measurements making it possible to locate said effective neighbor acquired by said robot, a step of determination of a set of local ideal positions corresponding to the positions that the robot could occupy relative to an effective neighbor to observe the pack constraint and a step of determination of a target position corresponding to a local ideal position that the robot could reach most rapidly.

Advantageously, the step of determination of the guidance instruction for said robot comprises:

a step of determination of a global barycenter corresponding to a weighted average of said at least one target position and of the ideal position by first and respectively second weights, a step of determination of a position error affecting the position of the robot to reach the global barycenter, a step of determination of a correction to be made to the velocity vector of the robot so as to reduce this error.

Advantageously, the single set of constraints comprises at least one constraint that is variable as a function of a measurable parameter.

Advantageously, the single set of constraints comprises at least one constraint having a single value.

Advantageously, when no obstacle verifying a predetermined avoidance condition is detected by the robot, the step of generation of the guidance instruction for the robot is performed at regular time intervals and is followed by a step of piloting of the robot so that it observes the guidance instruction, and, when the robot detects at least one obstacle verifying the obstacle avoidance condition, a step of generation of an obstacle avoidance guidance instruction followed by a step of piloting of the robot so that it observes the obstacle avoidance instruction.

Advantageously, each robot generates said guidance instruction and handles the piloting step so as to observe the guidance instruction.

Another subject of the invention is a set of robots suitable for implementing the method according to the invention, comprising guidance means embedded on board each of the robots, the embedded guidance means being configured so as to implement the step of generation of the guidance instruction.

BRIEF DESCRIPTION OF THE DRAWINGS

Other features and advantages of the invention will become apparent on reading the following detailed description, given as a nonlimiting example and with reference to the attached drawings in which.

DETAILED DESCRIPTION

From one figure to another, the same elements are identified by the same references.

The invention relates to a method for piloting a set of robots comprising at least two robots making it possible to bring it into or keep it in a predetermined pack configuration and follow a trajectory that is globally parallel to an ideal trajectory. Pack configuration should be understood to mean a geometrical figure formed by the set of robots. This method comprises, for each robot, a step of generation of a global guidance instruction which is a guidance instruction corresponding to a correction to be made to its velocity vector and a step of piloting of the robot so that it observes the guidance instruction. In other words, the piloting step is a step of controlling the velocity vector of the robot so as to correct the velocity vector. The aim of the correction is to reduce an error on the positioning of the robot. The step of generation 200 of the guidance instruction is performed by means of means, that is to say devices, embedded on board the robot. It is performed on the basis of the perception of the environment of the robot by means of measurement or perception means embedded on board the robot, that is to say by means of a perception device embedded on board the robot, and on the basis of a single set of constraints embedded on board each of the robots.

In the applications described previously, it may be necessary to pilot the robots in such a way that they move while observing a predetermined pack configuration. These configurations can take various forms.

Figure 1:
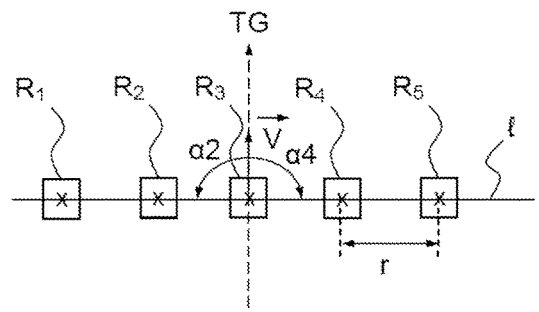
FIG. 1 schematically represents a set of robots observing an example of a pack configuration, FIG. 2 schematically represents a robot of a set of robots according to the invention, FIG. 3 schematically represents the steps of the method for piloting a robot according to the invention, FIG. 4 schematically represents the determination of a target position in the case of a pack configuration embodied by a distance to be observed between a robot and its direct neighbors, FIG. 5 schematically represents the trajectories followed by a set of robots when implementing a method for piloting a set of robots according to the invention, FIG. 6 schematically represents the trajectories followed by a set of robots when implementing a method for piloting a set of robots according to the invention when robots encounter an obstacle.

An example that has already been given at the beginning of the description is represented in FIG. 1. It is a configuration in which the robots R1, R2, R3, R4, R5 are arranged in a straight line I and spaced apart two by two by a predetermined ideal distance r set along this straight line I. This configuration is advantageous for exploring an area without leaving gaps by means of exploration sensors embedded on board the robots. The ideal distance is chosen as a function of the efficiency of the sensors with which the area is to be scanned (cameras, sonar, radar, magnetic, electrical, chemical detector, etc.). It is advantageously less than or equal to twice the range of the exploration sensors minus any positioning uncertainty.

A second example consists in imposing a fixed ideal distance between each robot and its closest neighbors. It should be noted that the set of robots piloted by means of the piloting method according to the invention tends in this case to form equilateral triangular meshes.

Generally, the pack configuration corresponding to the shape, called pack shape, formed by the set of robots is defined, in the method according to the invention, by a pack constraint. The pack constraint comprises a set of at least one first relative positioning constraint between a robot and its neighbors of the first order so that the set of robots presents the pack shape. It can also comprise a set of at least one first positioning constraint between the robot and neighbors of higher order. The set of at least one positioning constraint between the robot and its neighbors of the first order comprises a first distance constraint corresponding to the distance that has to separate a robot from its neighbors of the first order (that is to say its closest neighbors) to form the figure defined by the pack configuration. In other words, this distance is an ideal distance that has to separate a robot and its neighbors in the pack configuration. This ideal distance is then an instruction distance. The set further comprises, optionally, a first angular positioning constraint corresponding to an angular deviation that has to mutually separate the different neighbors of the first order of the robot.

The sets relating to the relative positioning constraints with the neighbors of higher order are of the same type.

In the piloting method according to the invention, the guidance instructions generated for each of the robots are determined from a single pack constraint comprising at least one set of at least one first relative positioning constraint between a robot and its neighbors of the first order in the pack so that the set of robots forms a pack exhibiting a predetermined shape.

In other words, all the robots receive the same pack constraint. This means that the first relative positioning constraint between a robot and its neighbors of the first order is a relative positioning constraint between each robot of the set of robots and its neighbors of the first order in the pack configuration.

The guidance instructions are not determined from absolute positions that the robots ought to occupy in the pack but on the basis of relative positions that the robots ought to occupy relative to one another to form the desired figure. In other words, this method does not require particular positions to be assigned to each of the robots in the pack to each of the robots. It is only necessary to supply the robot with a positioning constraint common to all the robots, that each robot must have relative to its neighbors for the set of robots to take the desired shape. This method is therefore more robust than the methods of the prior art.

Advantageously, the guidance instructions of each of the robots at a given instant are determined from a single set of constraints which is supplied to the set of robots. In other words, each of the robots of the set receives the same constraints and determines its guidance instructions from these same constraints. In other words, the set of constraints is common to all the robots.

The constraints which are supplied to each robot comprise:
  the pack constraint,
  a constraint of belonging representative of a second positioning constraint relative to said robot, that the robots of the set of robots, other than said robot, must effectively verify, to belong to a set of effective neighbors of said robot at the given instant,
  a four-dimensional ideal trajectory ideally followed by the robots, and
  a confidence range defined by the position of said robot relative to an ideal position corresponding to a position that the robot ought to occupy if it followed the ideal trajectory and possibly by its orientation, that is to say by the orientation of the robot, relative to the three-dimensional ideal trajectory included in the four-dimensional trajectory.

In other words, the set of constraints comprises a constraint of belonging common to all the robots. The constraint of belonging is representative of a second positioning constraint between each robot and the other robots so that the other robots belong to an effective vicinity of said robot at a given instant.

The four-dimensional ideal trajectory amounts to defining an ideal three-dimensional spatial trajectory and an associated ideal velocity that can change along the trajectory.

The step of determination of the guidance instruction for a robot at a given instant comprises a step of determination of a set of effective neighbors of said robot verifying the constraint of belonging to the vicinity of said robot.

The confidence range is a finite geometrical figure with 1, 2 or 3 dimensions which defines the orientation that is to be given to the pack relative to the ideal trajectory. It can, for example, be a segment, a hexagon, a sphere.

The guidance instruction for a robot at a given instant is generated from the position of the robot:
  relative to a set of at least one target position defined from each effective position of a set of effective neighbors, that is to say from the effective positions of each of the effective neighbors, and from the pack constraint, and relative to a preferred position corresponding to a point of the confidence range, when the set of effective neighbors is not empty,
  and relative to the preferred position when the set of effective neighbors is empty.

The method according to the invention makes it possible to pilot a set of robots arranged in any way at the outset, so that they come to move parallel to the globally ideal three-dimensional trajectory with the ideal velocity by being placed and being kept globally in a predetermined pack configuration.

In the method according to the invention, each robot is positioned as a function of the positions occupied by a set of neighbors relative to this robot. The method makes it possible to calculate the guidance instruction for a robot without having to know both the absolute position of the robot and the absolute position of all the other robots. It only requires the position of the robot to be determined relative to a set of effective robots comprising zero neighbors or more as well as the position of the robot relative to the preferred position defined relative to the set of mission constraints. This makes it possible to ensure that a predetermined pack configuration is followed robustly and inexpensively.

Moreover, the determination of the guidance instruction for a robot does not require any means of communication between robots of the set but only perception means which acquire data on the robots which make it possible to determine their relative positions.

Furthermore, in this method, the robots are not individualized. Each robot ensures its piloting as a function of the same constraints (neighborhood constraint and constraints defining the configuration of the pack, ideal trajectory and possibly confidence interval). This characteristic renders the system of robots simple. In effect, the robots all implement the same method to ensure their piloting, there is no need to provide for implementation of methods specific to each of the robots according to their role in the pack. In other words, there is no need to individually program the robots or identify them or assign them a place within the pack. This characteristic also renders the method robust, notably with respect to variations of the environment and the loss of any one of the robots. If certain elements of the pack are blocked, the rest of the pack will be able to continue its mission.

Examples of first positioning constraints will now be given.

In the example represented in FIG. 1, the pack constraint can be embodied by a set of first relative positioning constraints between a robot R3 and its neighbors of the first order in the pack. This set comprises two first positioning constraints including a constraint of ideal distance r having to separate a robot from its neighbors of the first order.

The set also comprises an angular constraint which is that its neighbors R2 and R4 must be situated at positions such that the oriented directions extending from the robot to its neighbors form oriented angles $\alpha 2$ and $\alpha 4$ of $+90°$ and $-90°$ relative to the oriented direction of the ideal velocity vector.

In the second example described previously, the pack constraint can comprise only one first positioning constraint on an ideal distance separating a robot from a predefined number of closest neighbors.

In a third example, the set of first relative positioning constraints between a robot and its neighbors of the first order comprises a constraint of ideal distance r having to separate a robot from its closest neighbors. It also comprises an angular constraint consisting in stating that the neighbors of the first order of a robot are situated in positions such that the oriented directions extending from the robot to its neighbors form angles of $30°$, $90°$, $150°$, $-30°$, $-90°$, $-150°$ with the oriented direction of the ideal velocity. A method based on this constraint is faster and more accurate than a method based on the preceding example but less simple and less robust to random factors.

Figure 2:
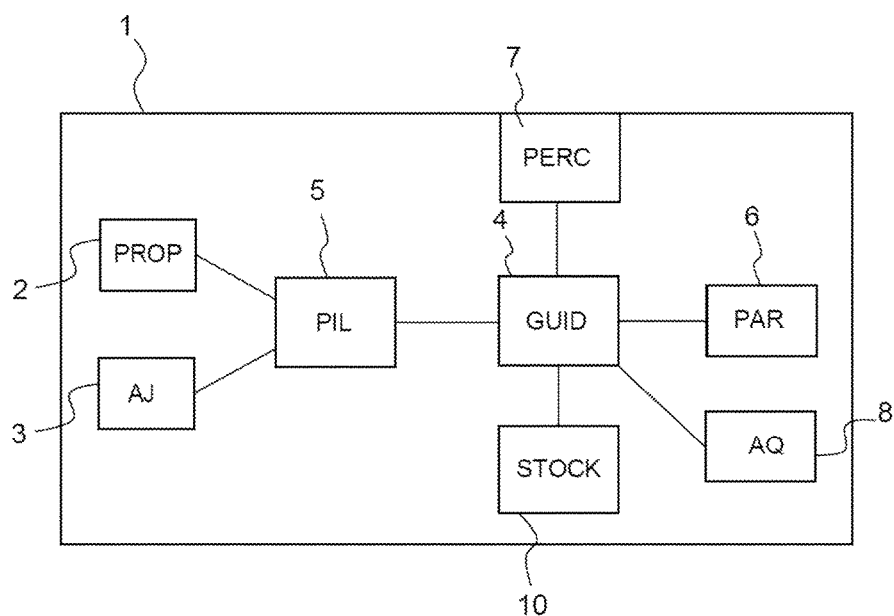

FIG. 2 shows a robot R, 1, according to the invention of a set of robots according to the invention. Each robot of the set of robots is equipped with means shown in FIG. 2.

The robot R is equipped with means listed below, these means being embedded on board said robot R:

propulsion means PROP, 2, that is to say a propulsion device, such as, for example, a motor and wheels, or a propeller, means for adjusting its velocity vector AJ, 3, that is to say a device that makes it possible to adjust the direction of the velocity vector of the robot, such as, for example, a steering column making it possible to pivot the wheels of the robot or a control surface, guidance means GUID, 4, that is to say a guidance device, suitable for generating a guidance instruction for the robot corresponding to a correction that has to be made to the velocity vector of the robot on the basis of the single set of constraints, on the basis of possible measurements on robots of the set other than said robot performed on board said robot and on the basis of measurements of absolute positioning of the robot, piloting means PIL, 5, that is to say a piloting device, suitable for piloting the propulsion means PROP, 2, and/or adjustment means AJ, 3, for observing the guidance instruction.

In other words, the robots of the set of robots are independent. Each of the robots generates its own guidance instructions and ensures its own piloting so as to observe the guidance instruction. The set of robots has no master suitable for piloting the set of robots. This characteristic makes it possible, as will be seen hereinbelow, to render the set of robots robust.

It should be noted that the guidance instruction corresponds to a correction that has to be made to the effective velocity vector of the robot at the given instant. The piloting step corresponds to an application of this correction to the velocity vector of the robot.

The other means embedded on board each of the robots are shown in FIG. 2 and will be described at the same time as the method according to the invention.

Figure 3:
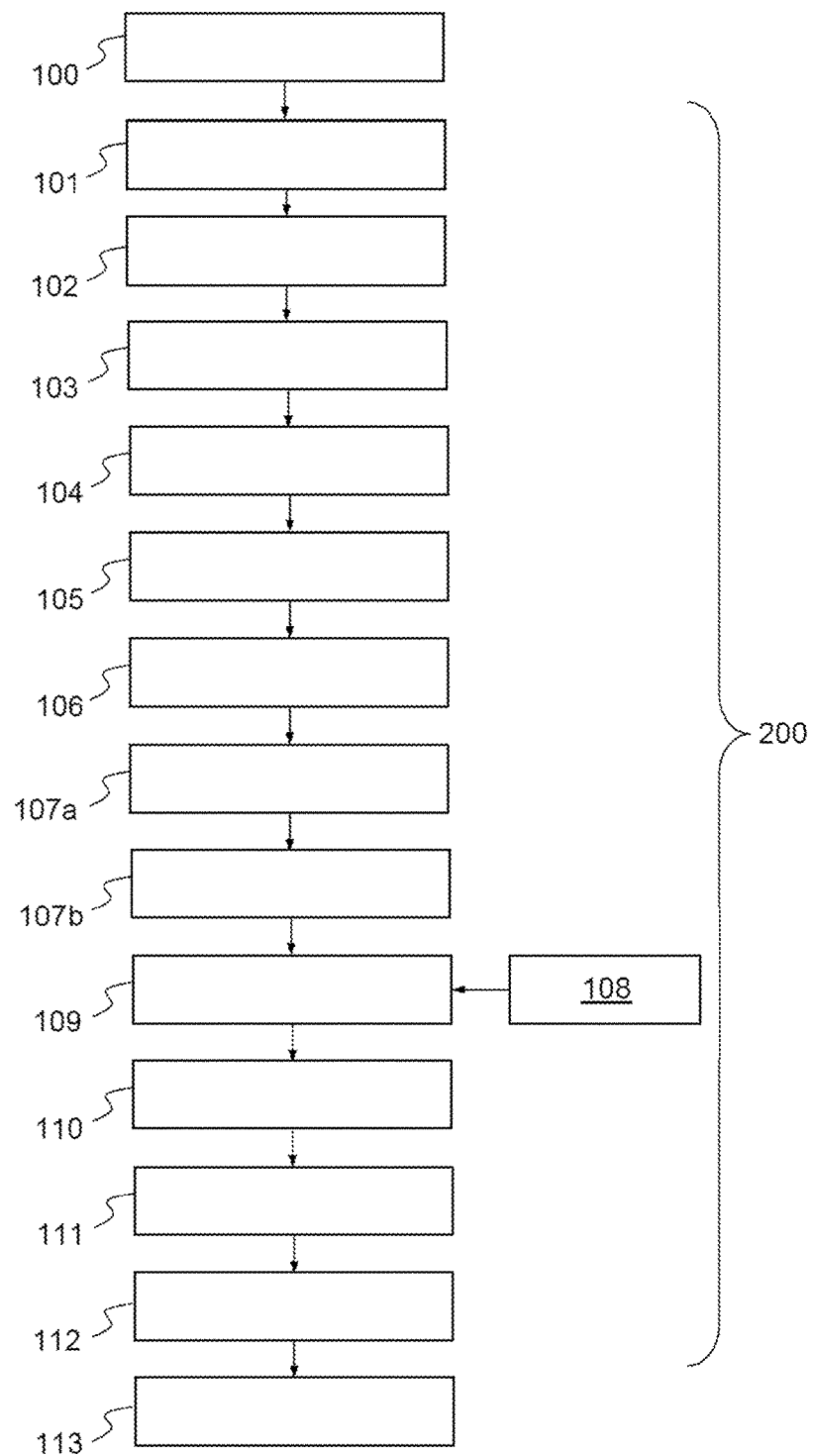

There now follows a description, with reference to FIG. 3, of the piloting method according to the invention.

This method comprises, for each of the robots of the set, a step of storage 100, in first storage means STOCK, 10, embedded on board said robot 1, of the single set of constraints. This step is advantageously implemented before the start of the mission. The storage means advantageously correspond to a storage device. The storage device comprises at least one memory space.

In the method according to the invention, the robots are moved in water. They are submersible robots. The invention applies also to robots suitable for being moved on land, in any other liquid or in air in a two- or three-dimensional manner.

In the embodiment of the invention, the robots are suitable for being moved on a support, here in the vicinity of the sea bed. The invention applies equally to robots suitable for being navigated in water, on its surface or at depth. The invention applies equally to robots suitable for flying.

In the embodiment of FIG. 3, the step of generation 200 of the guidance instruction at a given instant comprises, for each robot:

a first step of acquisition 102, by the guidance means 4, of the value of the pack constraint corresponding to the value of at the first set of at least one first parameter, a second step of acquisition 103, by the guidance means, of the value of the constraint of belonging corresponding to the value of a second set of at least one second parameter.

The parameters can be the concentration of a chemical species, of the turbidity of the water, of the temperature of the water.

The values of the parameters are measured 101 at a given instant by means of parameter measurement means PAR 6, that is to say from a parameter measurement device comprising sensors.

The acquisition step exists when the values of the constraints of positioning and/or respectively belonging are variable as a function of the values of the sets of parameters considered. For example, the ideal distance can be modified as a function of the concentration of a chemical species in the water. In this case, these constraints are stored in the forms of functions of the sets of parameters in the storage means STOCK.

The first and the second sets of parameters can be identical or different and comprise one or more parameters.

As a variant, the pack constraint and/or the constraint of belonging to the neighborhood of the robot has a single value.

The step 200 also comprises:

an acquisition step 104, during which the robot considered acquires, by means of perception or measurement means PERC 7, that is to say by means of a perception device, embedded on board the robot, possible measurements on the robots of the set of robots other than said robot, making it possible to locate them, directly or indirectly relative to the robot considered, a selection step 105, using said possible measurements, in which the guidance means 4 select a set of effective neighbors of the robot considered corresponding to a possibly empty subset of robots of the set of robots other than said robot which observes the constraint of belonging with respect to the robot.

If the robot has received no measurement on the other robots of the set of robots, then the set of effective neighbors is empty. In other words, the robot receives measurements on a set of robots called perceptible robots. If the set of perceptible robots is zero, then the set of effective robots is zero. None of the robots verifies the constraint of belonging. In other words, the acquisition step is a step performed by the robot to acquire measurements relating to the other robots of the set of robots. These measurements make it possible to locate the other robots relative to the robot. It is possible that the robot acquires no measurement on the other robots. The measurements can be performed on board the robot itself or else be performed on board other robots and transmitted to said robot via communication means.

It is sufficient for the measurement means PERC 7 to enable the robot to supply it with measurements enabling it to position the robots of said set, other than said robot, relative to the robot considered.

The measurement means PERC 7 comprise, for example, a sonar. They can optionally comprise means of communication between the robots of the set of robots enabling the robots to be transmitted information such as, for example, quantities measured by means of a measurement apparatus. They can comprise a beacon suitable for emitting a radio or acoustic signal (such as, for example, a non-directional beacon) and means for receiving the signals emitted by the beacons. The fact that the perception of the robots does not necessarily require communication means makes it possible to employ this message in any environment where a measurement is possible.

In the selection step 105, when the set of perceived robots is non-zero, a check is carried out to see if a robot perceived by the robot observes the constraint of belonging relative to the robot considered on the basis of the measurements obtained from the perception means. The constraint of belonging to the neighborhood of the robot is representative of a second constraint of positioning relative to said robot, that the perceived robots must verify, at the given instant, to belong to the set of effective neighbors of said robot, that is to say a set of eligible neighbors out of the perceived robots. It possibly comprises a constraint on a maximum number of robots that can be contained in the neighborhood.

The constraint of belonging depends on the perception means used.

An example of constraint of belonging is that the distance separating a perceived robot from the robot considered must be less than a predetermined maximum distance (possibly dependent on the value or values of the second set of parameters) or else that the ratio between this distance and the average distance separating the perceived robots from the robot considered must be less than a predetermined threshold. Another example of constraint is that the robot must be one of the N (N greater than 0) robots closest to the robot considered.

If the robots are all equipped with an active sonar emitting acoustic pings at the same instants, a constraint of belonging can be that the N selected robots are the robots originating the N (N greater than or equal to 0) acoustic pings emitted at a given instant received first by the robot considered. Another constraint is that the robot or robots selected are those which originate acoustic pings received by the robot considered before a predetermined instant or that the selected robot or robots are those which originate acoustic pings received by the robot considered which exhibit a decibel level above a predetermined level.

The constraint of belonging to the neighborhood is therefore directly or indirectly a second constraint of positioning of the robots relative to the robot considered. In the above-mentioned examples, it is either, directly or indirectly, a maximum distance that a robot must verify to belong in the effective neighborhood of the robot considered, or a condition of belonging to the N robots closest to the robot considered.

Advantageously, the constraint of belonging comprises a condition of maximum number N of robots that the neighborhood can contain. The subset of robots consists of N robots of the set of robots other than said robot. Such a neighborhood is called "peak neighborhood" in topology.

The number N of robots can comprise the number of robots of said set other than the robot considered. In this case, the generation of global guidance of a robot takes into account all the other robots of the set of robots. This feature makes it possible to simplify the method for piloting robots and to guarantee the adaptation of the system to restrictive navigation conditions.

Advantageously, the number of robots is less than the number of robots of the set of robots other than the robot considered. The robots are then driven solely as a function of a neighborhood renders the method robust. It is independent of the number of robots in the pack. This makes it robust to the loss of one of the robots.

As a variant, the maximum number is the number of neighbors of the first order of the robot in the pack configuration. The number is 2 in the example of FIG. 1.

The set of effective neighbors can be empty, that is to say comprise no robot, if none of the robots verifies the constraint of belonging or if the robot does not measure the position of any other robots (when the other robots are situated at a distance from the robot considered greater than the range of the perception means embedded on board the robot).

The step of generation of the guidance instruction for the robot further comprises, when the set of effective neighbors is not empty (as is the case in FIG. 3), for each effective neighbor:
- a step of determination 106 of an effective position corresponding to the position effectively occupied by said at least one effective neighbor relative to said robot on the basis of the measurements relating to said effective neighbor acquired by said robot,
- a step of determination 107a of a set of local ideal positions corresponding to the positions that the robot could occupy relative to the effective neighbor to observe the pack constraint and a step of determination 107b of a target position corresponding to a local ideal position that would be reached most rapidly by the robot for which the guidance instruction is determined.

This calculation is advantageously performed on the basis of the effective velocity vector of the robot at the given instant. As a variant, it is the position closest to the robot. If two ideal positions are equivalent, the choice is advantageously made by order of presentation in the software rather than by chance which could lead to an oscillation.

Figure 4:
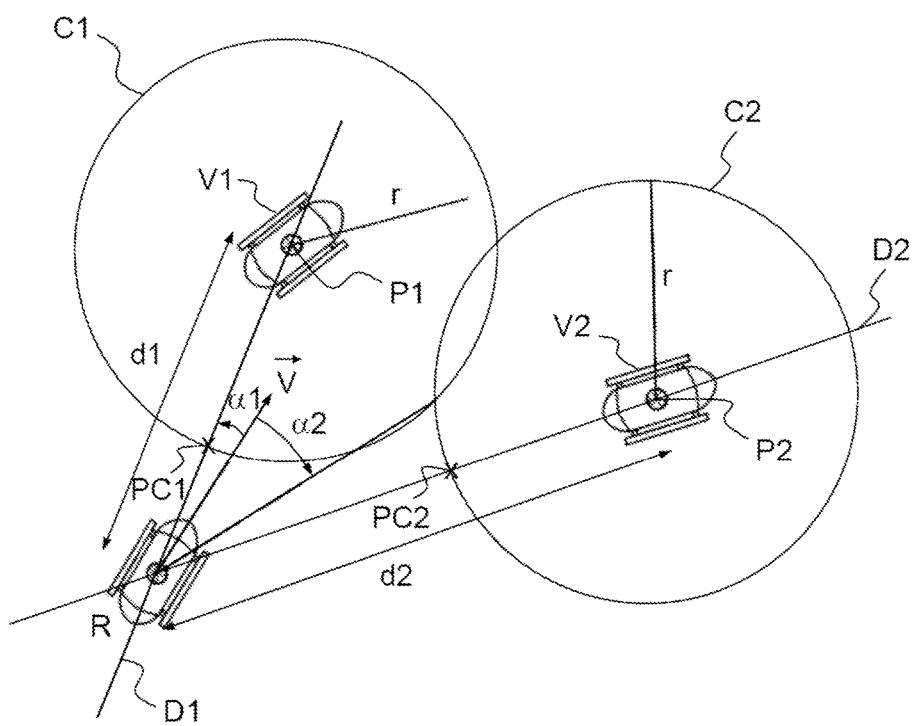

In the example represented in FIG. 4, the robot R has selected a set of effective neighbors comprising a first V1 and a second V2 neighbor robots. The step of determination 106 of the positions effectively occupied by the set of neighbors relative to said robot R consists in calculating the distances d1, d2 separating the neighbors from the robot and the relative angular positions $\alpha 1$, $\alpha 2$ between the neighbors and the robot R from the information obtained from the perception means with which the first robot is equipped (for example, on the basis of the measurements performed by a sonar embedded on board the robot). The relative angular positions correspond to the oriented angles $\alpha 1$, $\alpha 2$ formed between the effective velocity vector V of the robot and the straight line linking the position occupied by the neighbor V1, V2 and the position occupied by the robot R. From this information d1, d2, $\alpha 1$ and $\alpha 2$, the guidance means 4 can position the set of neighbors relative to the robot R.

In this embodiment, the pack constraint comprises only an ideal distance constraint r to be observed between a robot and its neighbors. The local ideal positions are therefore here circles c1 and c2 of radii R centered around the positions of the neighbors V1 and V2 (because the robots are moving here in a two-dimensional space, otherwise they would be spheres). The target positions PC1 and PC2 are here the positions of these circles closest to the robot R.

In the first embodiment represented in FIG. 3, the step of determination of the guidance instruction 200 further comprises a step of determination 110 of a global barycenter corresponding to a weighted average of the target positions and of the ideal position. This is the case where the confidence range is the ideal position. The ideal position is the position that the robot ought to occupy on the ideal trajectory. This position is the position that the robot ought to occupy at the moment of application of the guidance instruction, that is to say the given instant or a subsequent instant.

It should be noted that this step requires a preliminary step of acquisition 109, by the guidance means 4, of the position of the robot at the given instant in a fixed reference frame measured 108 by means of acquisition means AQ, 8, or an acquisition device, making it possible to acquire the position of the robot in a fixed reference frame, for example the terrestrial reference frame with, as indicated in the introduction, a lesser accuracy than the accuracy relative to the other robots.

The set of target positions is weighted by a first weight and the ideal position is weighted by a second weight, the first and second weights being non-zero and their sum being equal to 1. It will be noted that if the set of effective neighbors is empty, the duly calculated barycenter is the ideal position. In other words, in this case, the instruction is no longer defined in such a way as to observe a particular pack configuration but only in such a way as to follow (or join) the ideal position on the ideal trajectory.

The weights are stored in the storage means STOCK 10 preferably prior to the mission.

The first and second weights can be fixed or depend on the value of a third set of at least one parameter. The method then advantageously comprises a step of measurement of the value of said at least one third parameter and a step of acquisition, by the guidance means, of the values of the weights for the value of said third set of parameters before calculating the global barycenter.

The method then comprises a step 111 of determination of an error affecting the position of the robot corresponding to the vector linking the effective position of the robot to the global barycenter.

The method also comprises a step 112 of determination of a correction to be made to the effective velocity vector of the robot in order to reduce this error. The correction can be a correction of the first order and in this case the correction to be applied to the effective velocity vector of the robot is such that the velocity vector of the robot is directed from the effective position of the robot to the global barycenter.

The correction can be made according to numerous methods used in automatic systems, for example. It can a correction of PID, or proportional integral derivative, type.

The method further comprises a step of piloting 113 of the robot so as to observe the guidance instruction, that is to say so as to apply the desired correction to the effective velocity vector of the robot.

The guidance means are configured to be able to implement the steps 105 to 112 (excluding the step 108).

In a variant, the range of interest does not correspond to the ideal position but to a curve (1D, 2D or 3D), a surface (2D or 3D) or a volume.

The global barycenter is then calculated from the target positions and from a preferred position which is no longer the ideal position but which is a position of the confidence range. It is, for example, a position of the segment centered on the three-dimensional ideal trajectory, at right angles hereto and passing through the ideal position. This case is used when the aim is to position the robots in a line and space the robots apart from one another at right angles to the ideal trajectory and symmetrically relative to this trajectory.

The segment could be not centered relative to the ideal position so as to obtain a pack arranged in a non-symmetrical manner relative to the ideal trajectory. It could also be not at right angles relative to this trajectory so as to obtain a pack arranged on a line inclined relative to the ideal trajectory.

The preferred position is preferably the position of the tolerance range or confidence range which will be reached most rapidly by the robot given its velocity vector. It can also be the position closest to the robot.

The fact that the barycenter is calculated from a position of the tolerance range, that is to say the confidence range, makes it possible to limit the tendency of the pack to be compacted on the ideal trajectory.

The tolerance range, that is to say the confidence range, can have a single value or else be variable as a function of a fourth set of at least one measurable parameter. In the latter case, the method comprises a measurement of the value of the fourth set of at least one parameter and a step of acquisition of the value of the confidence range for said value before the calculation of the global barycenter.

Figure 5:
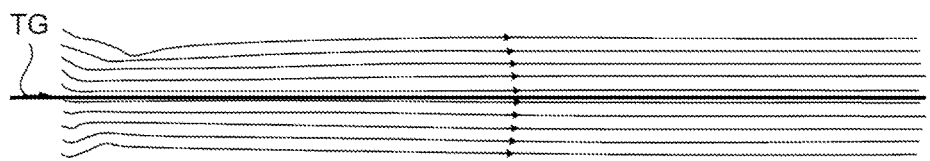

FIG. 5 shows, by lines provided with an arrow, trajectories associated with robots which are the trajectories effectively followed by these robots. This figure illustrates the behavior of a set of robots which are piloted by means of the method according to the invention according to the final variant embodiment in which the range of interest is a segment at right angles to the ideal trajectory and centered on the ideal position. The ideal trajectory TG is represented by thick lines. It is a linear trajectory around which the robots ideally move.

At the start of the implementation of the method according to the invention, the robots can be arranged randomly. FIG. 5 begins at a moment when the robots arrive virtually in the pack configuration and follow trajectories parallel to the ideal trajectory TG.

In FIG. 5, a tightening of the pack is observed early in the simulation. This is due to the slaving of the direction of the robots on the ideal trajectory (or central rail). Then, the robots reassume the desired pack formation under the effect of the pack constraint and continue to follow trajectories parallel to the global trajectory under the effect of the global instruction.

Figure 6:
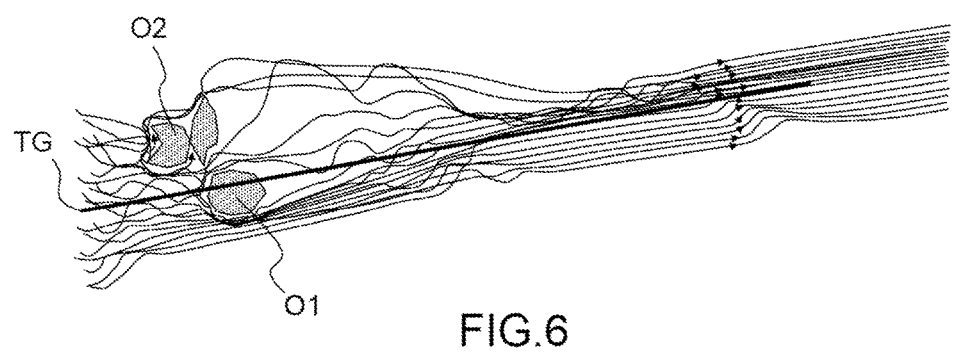

FIG. 6 illustrates a method for piloting a set of robots according to the invention.

In this method, when no obstacle verifying a predetermined avoidance condition (supplied to the set of robots) is detected by a robot considered, the step of determination of the guidance instruction for the robot considered is performed at regular time intervals and is sent to the piloting means which pilot 113 the robot so as to observe the guidance instruction. In other words, after each guidance instruction is established, the piloting means adjust the velocity of the robot so as to observe the guidance instruction.

When the robot perceives an obstacle O1, O2, verifying the avoidance condition, the piloting method comprises steps of establishment of obstacle avoidance guidance instructions, by the guidance means, which are transmitted to the piloting means which pilot the robot so as to observe this instruction. In other words, the method no longer establishes the guidance instructions or no longer transmits them to the piloting means. The method comprises a step of avoidance of the obstacle by the robot.

The obstacle avoidance methods are conventional methods known to those skilled in the art.

An exemplary implementation of this type of method is given hereinbelow. The perception means of the robot perceive an obstacle verifying an obstacle avoidance condition which is, for example, that the obstacle is fixed and on its trajectory, in front of it. The guidance means determine whether the obstacle in front of it is more in the left-hand part or more in the right-hand part of its perception area. It decelerates and then goes in the direction away from the presence of the obstacle: if the obstacle is more present to the left than to the right, the drone will go to the right, and vice-versa.

Once the obstacle is no longer perceived on the trajectory of the robot, the instruction which is transmitted to the piloting means is the guidance instruction, this instruction being calculated at regular time intervals.

FIG. 6 shows, by lines provided with an arrow, the trajectories followed by a set of robots. At the start of the path, the robots detect two obstacles O1 and O2. They implement an obstacle avoidance step. As soon as the obstacles are behind them, the robots implement the steps of establishment of the guidance instruction.

The environment represented in FIG. 6 is very uneven and yet, at the end of simulation, the pack forms a rectilinear set of the type of that of FIG. 2 and follows the ideal trajectory. The same result is obtained even if some robots are lost (that is to say do not manage to revert to the pack configuration). The method is robust to the loss of some robots of the set of robots.

The storage means are, for example, memory spaces and the guidance means are a computation function or else a computer or a computation module.

The invention claimed is:

1. A method for piloting a set of robots to bring it into or keep it in a predetermined pack configuration and for it to follow a trajectory that is globally parallel to a predetermined trajectory, the method comprising, for each robot of the set of robots:
   a step of generation of a guidance instruction for the robot at a given instant corresponding to a correction to be made to a velocity vector of the robot, the guidance instruction of each robot of the set of robots being determined using at least one measurement made by a perception device embedded on board the robot permitting to localize the robot relative to at least another robot of the set of robots and using a set of at least one constraint for determining the guidance instruction, the set of at least one constraint being common to all robots of the set of robots and comprising a pack constraint comprising at least one set of at least one relative positioning constraint including a first relative positioning constraint comprising a first distance constraint corresponding to a predetermined distance having to separate the robot from its closest neighbors, called neighbors of the first order in the predetermined pack configuration, and
   a step of piloting the robot so as to observe the guidance instruction,
   in which the set of at least one constraint includes a belonging constraint representative of a second relative positioning constraint that another robot of the set of robots has to respect relative to the robot to belong to a neighborhood of the robot at the given instant, and the predetermined trajectory which is a four-dimensional trajectory and a position that the robot ought to occupy if it followed the predetermined trajectory, and in which the step of generation of the guidance instruction for the robot at the given instant comprises a step of determination of the neighborhood of the robot, the neighborhood comprising each other robot verifying the constraint of belonging, the guidance instruction for the robot at the given instant being generated from the position of the robot:
   relative to a set of at least one target position defined from a position of each robot of the neighborhood and from the pack constraint and relative to a reference position, when the neighborhood is not empty,
   relative to the reference position when the neighborhood is empty.

2. The method as claimed in claim 1, in which the tolerance range is the reference position.

3. The method as claimed in claim 1, wherein the preferred position is a position of a predetermined curve, a predetermined surface or a predetermined volume which is reached most rapidly by the robot given its velocity vector.

4. The method as claimed in claim 1, in which the step of generation of the guidance instruction comprises:

an acquisition step, to acquire, by means of a perception device embedded on board the robot, measurements making it possible to locate the other robots relative to the robot, the step of determination of the neighborhood of the robot using the measurements the neighborhood being empty when no measurement enabling the robot to locate the other robots is acquired in the acquisition step.

5. The method as claimed in claim 4, in which the step of generation of the guidance instruction for the robot comprises, when the neighborhood comprises at least one robot called neighbor, for each neighbor:

a step of determination of a position occupied by the at least one neighbor relative to the robot from measurements, acquired in the acquisition step, making it possible to locate the neighbor, a step of determination of a set of positions that the robot can occupy relative to the neighbor in order to observe the pack constraint and a step of determination of a target position corresponding to the position of the set of positions that the robot could reach most rapidly.

6. The method as claimed in claim 5, in which the step of determination of the guidance instruction for the robot comprises:

a step of determination of a barycenter corresponding to a weighted average of the target position and of the position by first and respectively second weights, a step of determination of a position error affecting the position of the robot to reach the barycenter, a step of determination of a correction to be made to the velocity vector of the robot so as to reduce the position error.

7. The method as claimed in claim 1, in which the set of at least one constraint comprises at least one constraint that is variable as a function of a measurable parameter.

8. The method as claimed in claim 1, in which the set of at least one constraint comprises at least one constraint having a single value.

9. The method as claimed in claim 1, in which, when no obstacle verifying a predetermined avoidance condition is detected by the robot, the step of generation of the guidance instruction for the robot is performed at regular time intervals and is followed by a step of piloting of the robot so that it observes the guidance instruction, and, when the robot detects at least one obstacle verifying the predetermined obstacle avoidance condition, a step of generation of an obstacle avoidance guidance instruction followed by a step of piloting of the robot so that it observes the obstacle avoidance guidance instruction.

10. The method as claimed in claim 9, in which each robot of the set of robots generates the guidance instruction and handles the piloting step of piloting the robot so as to observe the guidance instruction.

11. The method as claimed in claim 1, in which, the tolerance range is further defined by an orientation relative to a three-dimensional trajectory included in the four-dimensional trajectory.

12. A set of robots suitable for implementing the method as claimed in claim 1, comprising a guidance device embedded on board each robot of the set of robots, the embedded guidance device being configured so as to implement the step of generation of the guidance instruction.

13. The method as claimed in claim 1, wherein the set of at least one constraint comprises a plurality of constraints.

14. The method as claimed in claim 1, in which the single set of at least one constraint comprises a plurality of constraints comprising the trajectory.

15. The method as claimed in claim 1, in which the guidance instruction of each robot of the set of robots being determined by a guidance device embedded on board the robot, the guidance device embedded on board the robot using localization of the robot relative to at least another robot of the set of robots determined using the measurements made by the perception device embedded on board the robot and the set of at least one constraint for determining the guidance instruction, the set of at least one constraint being a single set of at least one constraint common to common to all robots of the set of robots.

16. The method as claimed in claim 1, in which the guidance instruction being determined using localization of the robot relative to at least another robot of the set of robot determined using the measurements made by the perception device embedded on board the robot.

* * * * *